United States Patent
Yamazaki (10) Patent No.: US 9,386,457 B2
(45) Date of Patent: Jul. 5, 2016

(54) MOBILE COMMUNICATION SYSTEM, BASE STATION, AND USER TERMINAL

(71) Applicant: KYOCERA CORPORATION, Kyoto (JP)

(72) Inventor: Chiharu Yamazaki, Ota-ku (JP)

(73) Assignee: KYOCERA Corporation, Kyoto (JP)

( * ) Notice: Subject to any disclaimer, the term of this patent is extended or adjusted under 35 U.S.C. 154(b) by 75 days.

(21) Appl. No.: 14/380,965

(22) PCT Filed: Feb. 27, 2013

(86) PCT No.: PCT/JP2013/055203
§ 371 (c)(1),
(2) Date: Aug. 26, 2014

(87) PCT Pub. No.: WO2013/129505
PCT Pub. Date: Sep. 6, 2013

(65) Prior Publication Data
US 2015/0029928 A1     Jan. 29, 2015

Related U.S. Application Data

(60) Provisional application No. 61/604,721, filed on Feb. 29, 2012.

(51) Int. Cl.
*H04W 16/02* (2009.01)
*H04L 5/00* (2006.01)
(Continued)

(52) U.S. Cl.
CPC .............. *H04W 16/02* (2013.01); *H04B 7/024* (2013.01); *H04L 5/0035* (2013.01); *H04W 4/06* (2013.01); *H04W 16/10* (2013.01); *H04L 12/189* (2013.01); *H04W 16/30* (2013.01)

(58) Field of Classification Search
CPC ....... H04W 16/02; H04W 4/06; H04L 5/0035
See application file for complete search history.

(56) References Cited

U.S. PATENT DOCUMENTS

| 6,400,704 B2 | 6/2002 | Mikuni et al. |
| 2001/0001609 A1 | 5/2001 | Mikuni et al. |

(Continued)

FOREIGN PATENT DOCUMENTS

| JP | 2000-308124 A | 11/2000 |
| JP | 2007-228571 A | 9/2007 |
| WO | 2011/016618 A1 | 2/2011 |

OTHER PUBLICATIONS

An Office Action; "Notice of Reasons for Rejection," issued by the Japanese Patent Office on Jul. 28, 2015, which corresponds to the Japanese Patent Application No. 2014-502326 and is related to the U.S. Appl. No. 14/380,965; with English language statement of relevance.

(Continued)

*Primary Examiner* — Albert T Chou
(74) *Attorney, Agent, or Firm* — Studebaker & Brackett PC (57) ABSTRACT

A mobile communication system having a plurality of predefined cells that are mutually adjacent, comprises a spare cell that covers a boundary region of the plurality of predefined cells. The plurality of predefined cells use a predetermined frequency band and a first radio frame. The spare cell uses a second radio frame having a configuration different from the first radio frame so as to share the predetermined frequency band with the plurality of predefined cells through a time division.

6 Claims, 9 Drawing Sheets

(51) Int. Cl.
*H04W 4/06* (2009.01)
*H04W 16/10* (2009.01)
*H04B 7/02* (2006.01)
*H04L 12/18* (2006.01)
*H04W 16/30* (2009.01)

(56) References Cited

U.S. PATENT DOCUMENTS

| | | | | |
|---|---|---|---|---|
| 2007/0155431 | A1* | 7/2007 | Munzner | H04W 72/0406 455/560 |
| 2007/0178940 | A1 | 8/2007 | Hara | |
| 2010/0261493 | A1* | 10/2010 | Guey | H04B 7/024 455/501 |
| 2010/0278063 | A1* | 11/2010 | Kim | H04L 5/0073 370/252 |
| 2013/0029669 | A1* | 1/2013 | Boudreau | H04W 16/28 455/444 |
| 2013/0252625 | A1* | 9/2013 | Benjebbour | H04W 16/02 455/452.1 |
| 2013/0344909 | A1* | 12/2013 | Davydov | H04B 7/0689 455/501 |

OTHER PUBLICATIONS

International Search Report; PCT/JP2013/055203; Apr. 23, 2013.
3GPP TR 36.819 V11.0.0 (Sep. 2011); 3rd Generation Partnership Project; Technical Specification Group Radio Access Network; Coordinated multi-point operation for LTE physical layer aspects (Release 11).
An Office Action; "Notice of Reasons for Rejection," issued by the Japanese Patent Office on Jul. 28, 2015, which corresponds to the Japanese Patent Application No. 2014-502326 and is related to the U.S. Appl. No. 14/308,965; with English language statement of relevance.
Tokyo Institute of Technology, KDDI; "Distributed Dynamic CoMP for LTE-Advanced (Revision from R1-093608)"; 3GPP TSG RAN WG1 Meeting #58B; R1-094285; Oct. 12-16, 2009; pp. 1-21; Miyazaki, Japan.

* cited by examiner

MOBILE COMMUNICATION SYSTEM, BASE STATION, AND USER TERMINAL

TECHNICAL FIELD

The present invention relates to a mobile communication system, a base station, and a user terminal with which a throughput in a cell boundary region is improved.

BACKGROUND ART

3GPP (3rd Generation Partnership Project), which is a project aiming to standardize a mobile communication system, plans to promote the standardization of CoMP (Coordinated Multi-Point) in its release 11 onward (see Non Patent Literature 1).

In CoMP, an antenna group arranged in the same place is positioned as one "point" and a plurality of points communicate with a user terminal in cooperation with one another. A point group that performs cooperative communication with a user terminal by using one time and frequency resource is called a CoMP cooperating set.

Furthermore, a form of CoMP is Intra-Site CoMP. In Intra-Site CoMP, when a user terminal is positioned in a boundary region of a plurality of cells belonging to one base station, each cell is considered as a "point", and the plurality of cells perform CoMP communication with the user terminal. Thus, the throughput in the cell boundary region can be improved.

In addition, it is noted that a "cell" is used as a term indicating a unit of a radio communication area, and is also used as a term indicating a function of performing radio communication with a user terminal. Furthermore, a "cell" is also called a "sector".

PRIOR ART DOCUMENT

Non-patent Document

Non-patent Document 1: 3GPP TR 36.819 V11.0.0 (2011-09)

SUMMARY OF THE INVENTION

However, the problems with CoMP is that not only the time and frequency resource of each of the plurality of cells corresponding to the plurality of points is consumed, but the communication control for facilitating cooperation among the plurality of cells is complicated.

Thus, an object of the present invention is to provide a mobile communication system, a base station, and a user terminal with which it is possible to improve a throughput in a cell boundary region without performing a complicated communication control.

In order to solve the problems, the present invention has following features.

A mobile communication system according to the present invention is characterized by a system having a plurality of predefined cells that are mutually adjacent and comprising: a spare cell that covers a boundary region of the plurality of predefined cells, wherein the plurality of predefined cells use a predetermined frequency band and a first radio frame, and the spare cell uses a second radio frame having a configuration different from the first radio frame so as to share the predetermined frequency band with the plurality of predefined cells through a time division.

When a user terminal is positioned in the boundary region, if the plurality of predefined cells and the spare cell belong to the same base station, then the user terminal may perform non-CoMP communication with the spare cell.

When a user terminal is positioned in the boundary region, if the plurality of predefined cells belong to different base stations, then the user terminal may perform CoMP communication with the plurality of predefined cells.

When the plurality of predefined cells belong to the same base station, the base station may determine whether or not to form the spare cell depending on the number of user terminals positioned in the boundary region.

The first radio frame may include a first MBSFN subframe and a first non-MBSFN subframe, and the second radio frame may include a second MBSFN subframe that overlaps the first non-MBSFN subframe on a time axis, and a second non-MBSFN subframe that overlaps the first MBSFN subframe on a time axis.

A base station according to the present invention is characterized by a base station having a plurality of predefined cells that are mutually adjacent and comprising: a spare cell that covers a boundary region of the plurality of predefined cells, wherein the plurality of predefined cells use a predetermined frequency band and a first radio frame, and the spare cell uses a second radio frame having a configuration different from the first radio frame so as to share the predetermined frequency band with the plurality of predefined cells through a time division.

A user terminal according to the present invention is characterized by a user terminal in a mobile communication system having a plurality of predefined cells that are mutually adjacent, the user terminal comprising: a control unit that controls to perform non-CoMP communication with a spare cell when the plurality of predefined cells and the spare cell that covers the boundary region belong to the same base station if the user terminal is positioned in the boundary region of the plurality of predefined cells, wherein the plurality of predefined cells use a predetermined frequency band and a first radio frame, and the spare cell uses a second radio frame having a configuration different from the first radio frame so as to share the predetermined frequency band with the plurality of predefined cells through a time division.

DESCRIPTION OF THE EMBODIMENTS

Hereinafter, embodiments of the present invention will be described with reference to the accompanying drawings. Note that in the following drawing according to the embodiments, identical or similar symbols are assigned to identical or similar portions.

(Overview of Embodiment)

A mobile communication system having a plurality of mutually adjacent predefined cells has a spare cell that covers the boundary region of the plurality of predefined cells. The plurality of predefined cells use a predetermined frequency band and a first radio frame. In order to share the predetermined frequency band with the plurality of predefined cells through a time division, the spare cell uses a second radio frame having a configuration different from the first radio frame.

Thus, rather than performing CoMP communication with the plurality of predefined cells, the user terminal positioned in the boundary region of the plurality of predefined cells can perform non-CoMP communication with one spare cell that covers the boundary region. Therefore, the throughput in the cell boundary region can be improved without performing a complicated communication control.

In the present embodiment, a mobile communication system (hereinafter, called an "LTE system") configured on the basis of 3GPP standards (that is, LTE-Advanced) after release 10 will be described.

(Overview of LTE System)

Figure 1:
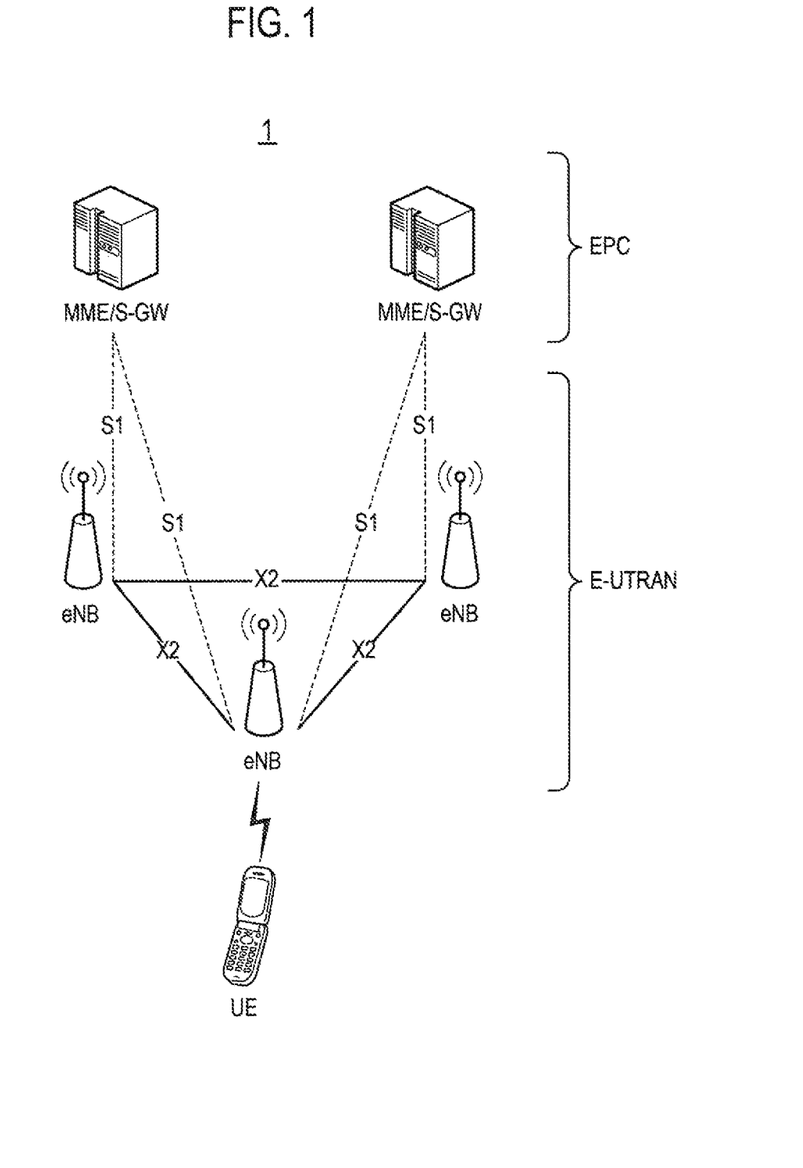
FIG. 1 is a configuration diagram of an LTE system.

First, the overview of an LTE system will be described. FIG. 1 is a configuration diagram of the LTE system.

As illustrated in FIG. 1, an LTE system 1 includes UE (User Equipment), E-UTRAN (Evolved-UMTS Terrestrial Radio Access Network), and EPC (Evolved Packet Core).

The UE is a mobile radio communication device and corresponds to a user terminal. The UE is a mobile radio communication device, and performs radio communication with a cell (called a "serving cell"), with which a connection is established, in a connected state corresponding to a state during a connection. The process of changing the serving cell of the UE is called handover.

The E-UTRAN includes a plurality of eNBs (evolved Node-Bs). The eNB is a stationary radio communication device that performs radio communication with the UE, and corresponds to a base station. Each eNB configures one cell or a plurality of cells. The eNB, for example, has a radio resource management (RRM) function, a routing function of user data, and a measurement control function for mobility control and scheduling.

The EPC includes MME (Mobility Management Entity) and S-GW (Serving-Gateway). The EPC corresponds to a core network. The MME is a network entity that performs various mobility controls for the UE, and corresponds to a control station. The S-GW is a network entity that performs transfer control of user data, and corresponds to a switching center.

The eNBs are connected to one another through an X2 interface. Furthermore, the eNBs are connected to the MME and the S-GW through S1 interfaces.

Figure 2:
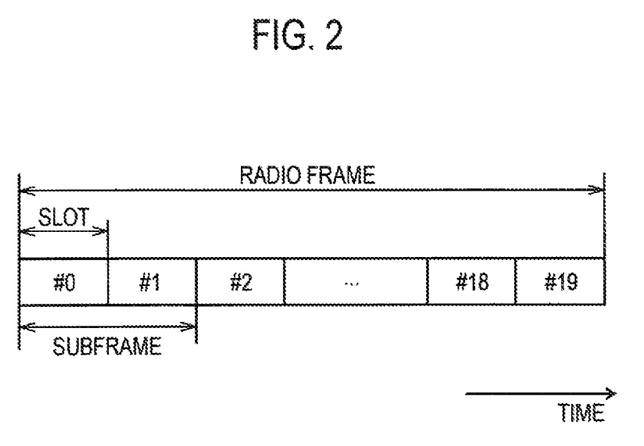
FIG. 2 is a schematic configuration diagram of a radio frame used in the LTE system.

FIG. 2 is a schematic configuration diagram, of a radio frame used in the LTE system 1. The LTE system 1 employs OFDMA (Orthogonal Frequency Division Multiplexing Access) in a downlink and SC-FDMA (Single Carrier Frequency Division Multiple Access) in an uplink.

As illustrated in FIG. 2, the radio frame includes 10 subframes arranged in the time direction, wherein each subframe includes two slots arranged in the time direction. Each subframe has a length of 1 ms and each slot has a length of 0.5 ms. Each subframe includes a plurality of resource blocks (RBs) in a frequency direction, and a plurality of symbols in the time direction. Each symbol is provided at a head thereof with a guard interval called a cyclic prefix (CP).

In the downlink (DL), an interval of several symbols at the head of each subframe is a control region mainly used as a physical downlink control channel (PDCCH). Furthermore, a remaining interval of each subframe is a data region mainly used as a physical downlink shared channel (PDSCH).

In the uplink (UL), both end portions in the frequency direction of each subframe are control regions mainly used as a physical uplink control channel (PUCCH). Furthermore, the center portion in the frequency direction of each subframe is a data region mainly used as a physical uplink shared channel (PUSCH).

The eNB transmits a broadcast signal in a specific subframe within the radio frame. The broadcast signal is, for example, a synchronization signal and system information. The synchronization signal includes a primary synchronization signal (PSS) and a secondary synchronization signal (SSS).

The PSS is mapped to the last symbol in each slot of the subframes with the subframe number #0 and the subframe number #5, and the SSS is mapped to the second symbol from the last (that is, the symbol immediately before the PSS) in the same slot.

When the UE receives the PSS and the SSS normally, the UE can discover the cell and perform synchronization. After the completion of the cell search, when the UE receives the system information from the cell normally, the UE acquires the information necessary for communicating within the cell from the system information, and performs the processing (access and registration) for connecting to the cell.

The system information includes a master information block (MIB) and a system information block (SIB). The MIB is transmitted by using a physical broadcast channel (PBCH) mapped to the subframe with the subframe number #0. The MIB includes the information necessary for receiving the SIB. The SIB is transmitted using the PDSCH. The SIB includes the information necessary for accessing a cell. SIB1 is mapped to the subframe #5, and SIB2 onwards are mapped to the subframes specified in the SIB1.

(Overview of CoMP)

Next, an overview of CoMP is provided. In the CoMP, an antenna group arranged in the same place is positioned as one "point" and a plurality of points communicate with the UE in cooperation with one another. A point group performing cooperative communication with the UE is called a CoMP cooperation set.

A type of CoMP is JP (Joint Processing), which is a format that enables the use of the data that must be communicated to the UE in a plurality of points in the CoMP cooperation set.

A type of JP in the downlink (DL) is JT (Joint Transmission), by which a plurality of points in the CoMP cooperation set simultaneously transmit data to the UE. When the UE is positioned in the cell boundary region, combined benefits are obtained by receiving the data from a plurality of cells (points) by using the same time and frequency resource, and therefore, the communication quality as well as the throughput improves.

A type of JP in the uplink (UL) is JR (Joint Reception) by which a plurality of points in the CoMP cooperation set receive the same data from the UE. When the UE is positioned in the cell boundary region, combined benefits are obtained by combining the data received by a plurality of cells (points), and therefore, the communication quality as well as the throughput improves.

Figure 3:
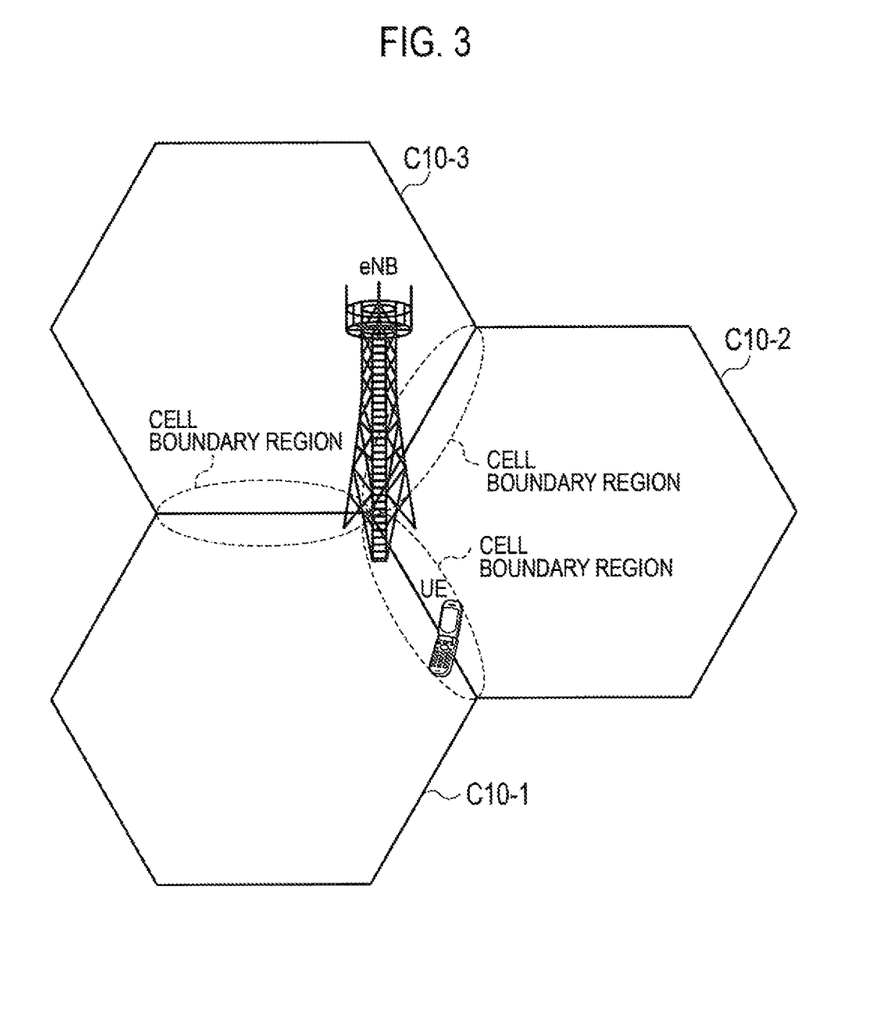
FIG. 3 is a diagram for explaining Intra-Site CoMP.

FIG. 3 is a diagram for explaining the form (Intra-Site CoMP) of performing CoMP with the plurality of cells belonging to the same eNB as "points".

As illustrated in FIG. 3, in the present embodiment, the eNB has the three cells C10-1 through C10-3, however, the eNB may have four or more cells. The cells C10-1 through C10-3 are mutually adjacent. For example, by providing three antennas directed in a direction that differs in each antenna by 120° in the eNB, the cells C10-1 through C10-3 illustrated in FIG. 3 can be formed.

The UE is positioned in the boundary region of the cells C10-1 and C10-2. In such a case, the cells C10-1 and C10-2 belonging to the same eNB perform CoMP (Intra-Site CoMP) with the UE in cooperation with one another, and as a result, the throughput in the UE can be improved. However, in Intra-Site CoMP, in order to facilitate cooperation with one another in the cells C10-1 and C10-2, a complicated communication control must be performed in the eNB.

Figure 4:
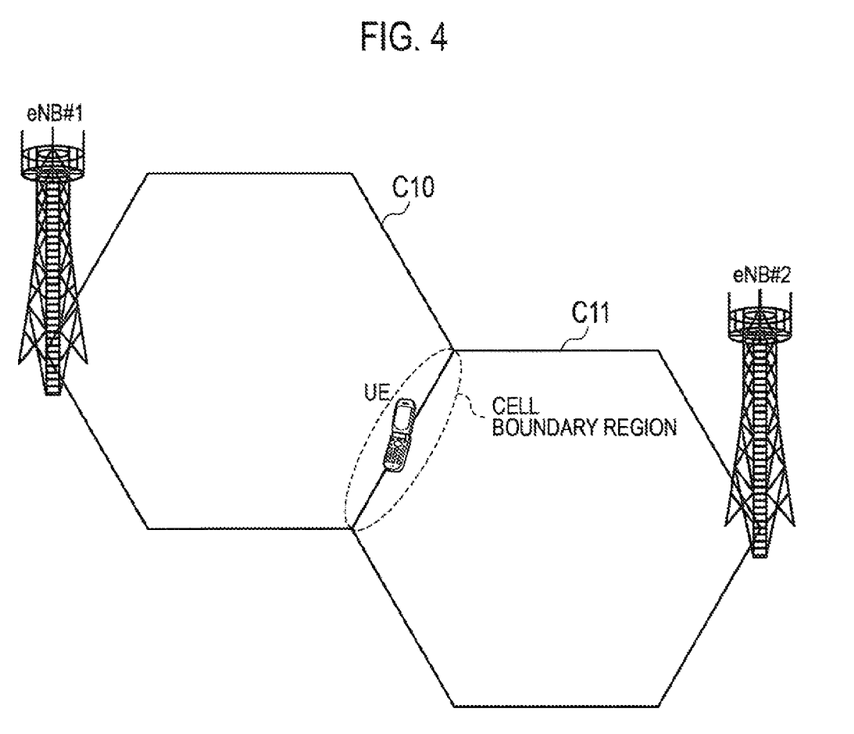
FIG. 4 is a diagram for explaining Inter-Site CoMP.

FIG. 4 is a diagram for explaining the form (Inter-Site CoMP) of performing CoMP with the cells belonging to different eNBs as "points".

As illustrated in FIG. 4, the UE is positioned in the boundary region between a cell C10 of eNB #1 and a cell C11 of eNB #2. In such a case, the cell C10 and the cell C11 belonging to different eNBs perform CoMP (Inter-Site CoMP) with the UE in cooperation with one another, and as a result, the throughput in the UE can be improved. However, in Inter-Site CoMP, in order to facilitate cooperation of eNBs with one another, various types of information must be transmitted and received on the X2 interface.

(Configuration of eNB and UE)

Next, the configuration of the eNB and the UE will be described.

Figure 5:
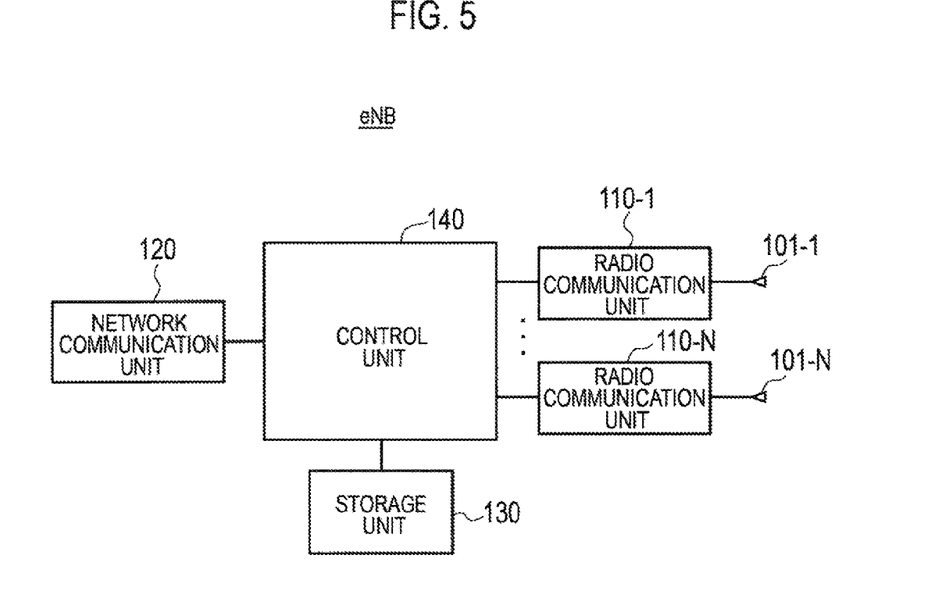
FIG. 5 is a block diagram of eNB according to an embodiment.

FIG. 5 is a block diagram of the eNB according to the present embodiment. As illustrated in FIG. 5, the eNB includes a plurality of radio communication units 110 provided in each of a plurality of cells, a network communication unit 120, a storage unit 130, and a control unit 140. An antenna (directivity antenna) 101 is provided in each of the plurality of radio communication units 110.

The radio communication unit 110 performs radio communication through the corresponding antenna 101. During transmission, the radio communication unit 110 transmits a radio signal by up-converting and amplifying a baseband signal that is input from the control unit 140. During reception, the radio communication unit 110 amplifies and down-converts a reception signal that is input from the antenna 101, and then outputs a baseband signal to the control unit 140.

The network communication unit 120 communicates with the EPC using the S1 interface. Furthermore, the network communication unit 120 performs communication (inter-base station communication) with an adjacent eNB using the X2 interface.

The storage unit 130 is configured using a memory and the like and stores various types of information used for control and the like by the control unit 140. The control unit 140 is configured using a processor and the like, and controls various functions of the eNB.

Figure 6:
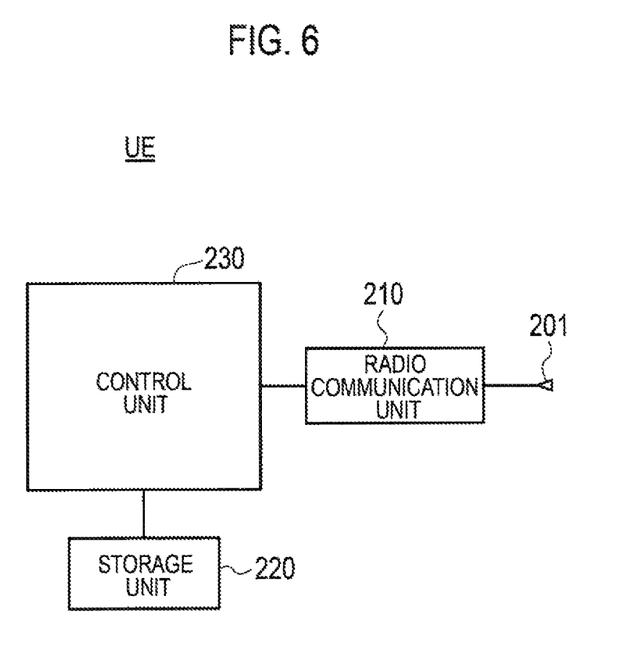
FIG. 6 is a block diagram of UE according to the embodiment.

FIG. 6 is a block diagram of the UE according to the embodiment. As illustrated in FIG. 6, the UE includes a radio communication unit 210, a storage unit 220, and a control unit 230. An antenna (directivity antenna) 201 is provided in the radio communication unit 210.

The radio communication unit 210 is configured to perform radio communication through the antenna 201. During transmission, the radio communication unit 210 outputs a radio signal from the antenna 201 by up-converting and amplifying a baseband signal that is input from the control unit 230. During reception, the radio communication unit 210 amplifies and down-converts a reception signal that is input from the antenna 201, and then outputs a baseband signal to the control unit 230.

The storage unit 220 is configured using a memory and the like and stores various types of information used for control and the like by the control unit 230. The control unit 230 is configured using a processor and the like, and controls various functions of the UE.

(Operation)

Next, an operation of the LTE system 1 according to the present embodiment will be described using FIG. 3, FIG. 4, and FIG. 7 through FIG. 9.

As illustrated in FIG. 3, in Intra-Site CoMP, although the throughput in the UE can be improved by the cooperation of the cells C10-1 and C10-2 with one another, it is necessary to perform a complicated communication control in order to facilitate cooperation with one another in the cells C10-1 and C10-2. Thus, a general cell of the eNB is positioned as a "predefined cell", and a new cell that covers the boundary region of the predefined cell is defined as a "spare cell".

Figure 7:
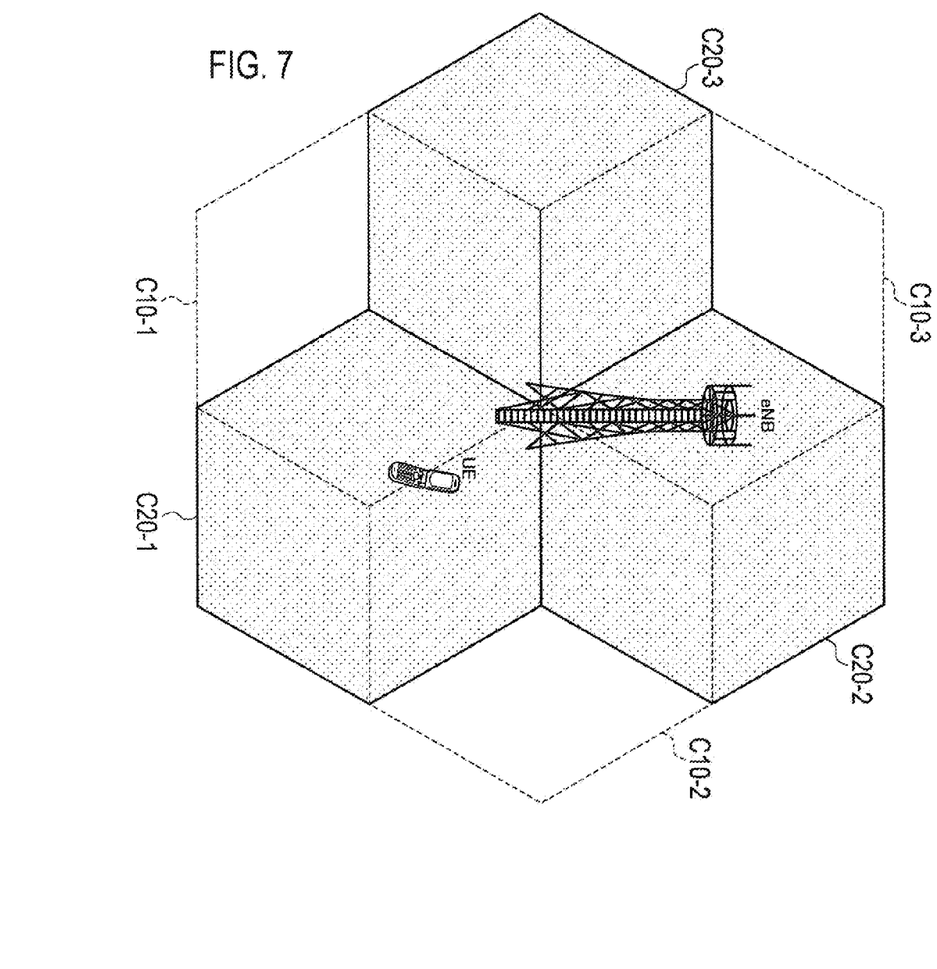
FIG. 7 is a diagram for explaining a spare cell according to the embodiment.

FIG. 7 is a diagram for explaining a spare cell C20. In FIG. 7, the predefined cell C10 is illustrated by a broken line.

As illustrated in FIG. 7, in addition to the predefined cell C10, the eNB has the spare cell C20 that covers the boundary region of the predefined cell C10. In the present embodiment, the eNB forms one predefined cell C10 in each of the pair of adjacent predefined cells C10. Furthermore, the shape of each spare cell C20 is the same as the shape of each predefined cell C10. For example, in addition to the antenna for forming the predefined cell C10, by providing three antennas directed in a direction that differs in each antenna by 60° in the eNB, spare cells C20-1 through C20-3 can be formed.

The spare cell C20 uses the same frequency band (predetermined frequency band) as the predefined cell C10. The predefined cell C10 uses a predetermined frequency band and a first radio frame, and in order to share the predetermined frequency band with the predefined cell C10 through a time division, the spare cell C20 uses a second radio frame having a configuration different from the first radio frame. As a result, the occurrence of a frequency interference between the predefined cell C10 and the spare cell C20 can be prevented.

Figure 8:
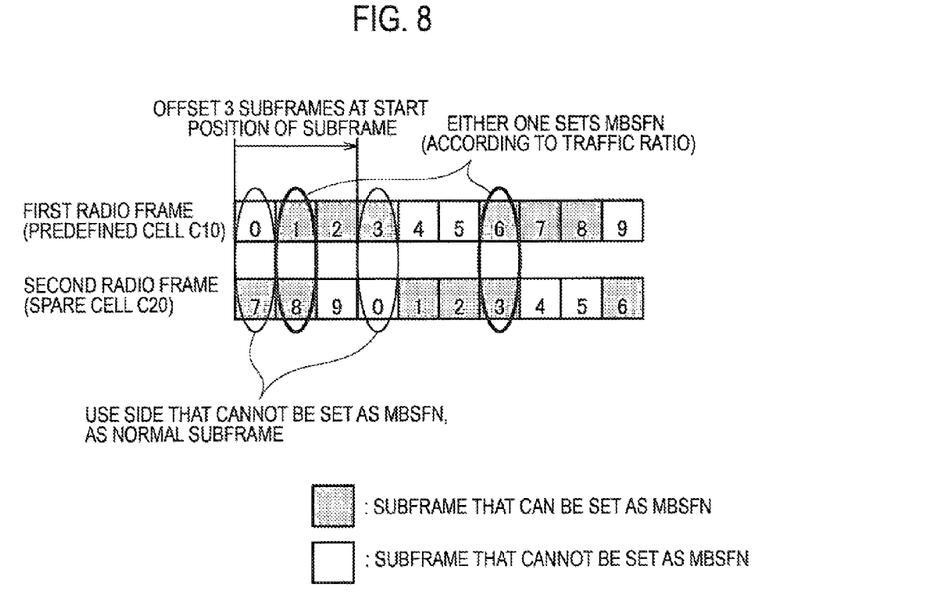
FIG. 8 is a diagram for explaining a first radio frame and a second radio frame according to the embodiment.

FIG. 8 is a diagram for explaining the first radio frame and the second radio frame. In FIG. 8, the hatched subframes are subframes that can be set as MBSFN (Multicast/Broadcast Single Frequency Network) subframes for MBMS (Multimedia Broadcast Multicast Services). In contrast, the un-hatched subframes are subframes that cannot be set as MBSFN subframes (hereinafter, called the "non-MBSFN subframes").

As illustrated in FIG. 8, the eNB sets the (subframe number of the) second radio frame with shifting by only a predetermined number of subframes. In detail, the subframe number #0 in the second radio frame has an offset of three subframes with reference to the subframe number #0 in the first radio frame.

The first radio frame includes the first MBSFN subframes (subframe numbers #1, #2, #3, #6, #7, and #8) and the first non-MBSFN subframes (subframe numbers #0, #4, #5, and #9). The second radio frame includes the second MBSFN subframes (subframe numbers #1, #2, #3, #6, #7, and #8) and the second non-MBSFN subframes (subframe numbers #0, #4, #5, and #9).

The first non-MBSFN subframes (subframe numbers #0, #4, #5, and #9 of the first radio frame) and the second MBSFN subframes (subframe numbers #1, #2, #6, and #7 of the second radio frame) overlap on the time axis, and the second non-MBSFN subframes (subframe numbers #0, #4, #5, and #9 of the second radio frame) and the first MBSFN subframes (subframe numbers #2, #3, #7, and #8 of the first radio frame) overlap on the time axis.

As a result, normal communication with the UE can be performed in the non-MBSFN subframe in one radio frame, and the subframe that overlaps the non-MBSFN subframe in the other radio frame cannot perform normal communication as the MBSFN subframe. Therefore, the same frequency band can be shared between the predefined cell C10 and the spare cell C20 through a time division.

In FIG. 8, some of the MBSFN subframes (subframe numbers #1 and #6) of the first radio frame and some of the MBSFN subframes (subframe numbers #8 and #3) of the second radio frame overlap on the time axis. Of the MBSFN subframes that overlap on the time axis, some of the MBSFN subframes can be set as normal subframes (non-MBSFN subframes).

In order to adjust the ratio of the time division on the basis of the traffic status in each of the predefined cell C10 and the spare cell C20, the eNB may reset the frame configuration of each of the first radio frame and the second radio frame. In detail, of the MBSFN subframes that overlap on the time axis, the MBSFN subframes corresponding to the cell with a higher traffic are set as normal subframes (non-MBSFN subframes). As a result, more of the normal subframes (non-MBSFN subframes) can be used in the cell having the higher traffic of the predefined cell C10 and the spare cell C20, and thus, the communication capacity can be increased.

It must be noted that the first radio frame includes the subframes (hereinafter, called the "first specific subframes") that must transmit the DL broadcast signal (MIB/SIB/PSS/SSS), and the second radio frame includes the subframes (hereinafter, called the "second specific subframes") that must transmit the DL broadcast signal (MIB/SIB/PSS/SSS). In detail, the first specific subframes are the subframes with the subframe numbers #0 and #5 of the first radio frame, and the second specific subframes are the subframes with the subframe numbers #0 and #5 of the second radio frame. Because the first specific subframes and the second specific subframes do not overlap on the time axis, it is possible to ensure that the subframes that must transmit the DL broadcast signal (MIB/SIB/PSS/SSS) do not overlap in the first radio frame and the second radio frame.

However, by forming the spare cell C20, and setting the first radio frame and the second radio frame as described above, the throughput of the predefined cell C10 can be reduced. Therefore, the spare cell C20 may be formed only when the number of UEs positioned in the boundary region of the predefined cell C10 is large, that is, only when a high throughput improvement effect is expected.

Figure 9:
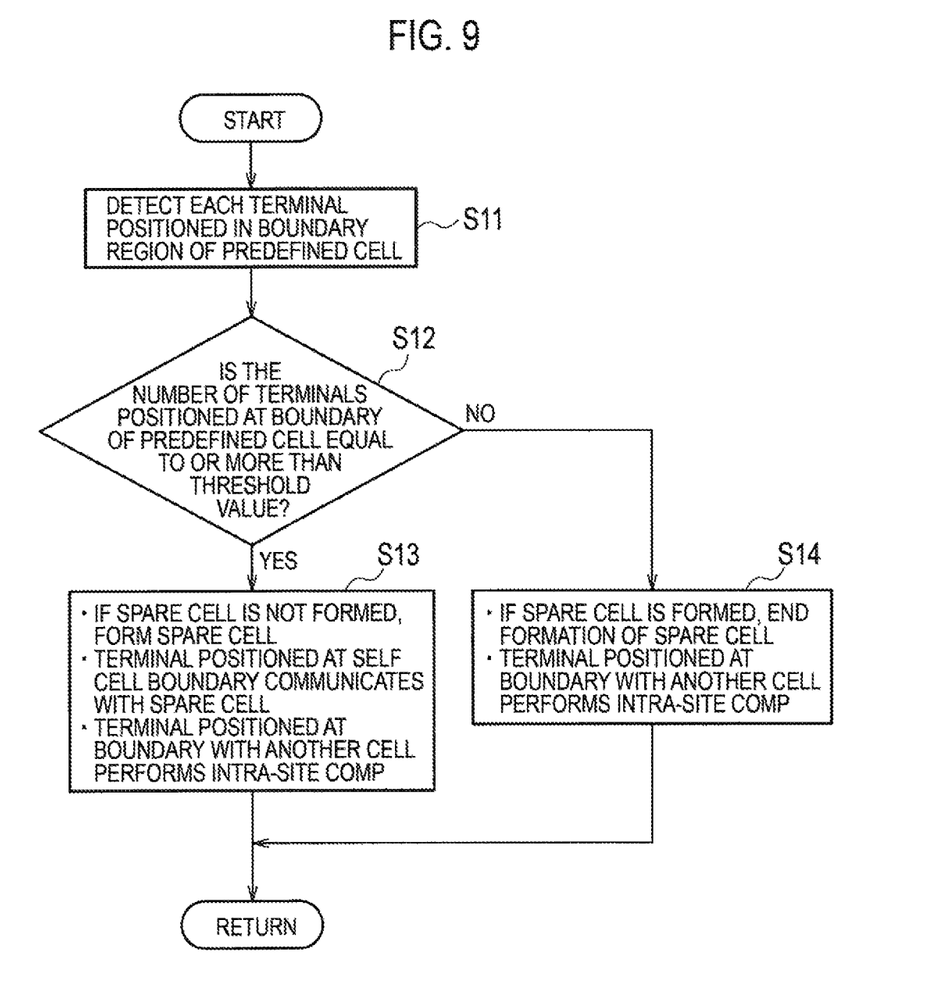
FIG. 9 is an operation flowchart of the eNB and the UE according to the embodiment.

FIG. 9 is an operation flowchart of the eNB and the UE according to the present embodiment.

As illustrated in FIG. 9, in step S11, the eNB detects each UE positioned in the boundary region of the predefined cell C10. In detail, the eNB detects the UE positioned in the boundary region of the predefined cell C10 on the basis on the measurement report for reporting the measurement result of the reception level of each UE to the eNB. For example, if the measurement report received from the UE indicates that the reception level of each of the two predefined cells C10 is the same, the eNB can determine that the UE is positioned in the boundary region of the two predefined cells C10.

In step S12, the eNB checks if the number of UEs positioned in the boundary region of the predefined cell 10 is equal to or above a threshold value. If the number of UEs positioned in the boundary region of the predefined cell 10 is equal to or above the threshold value (step S12; YES), the processing proceeds to step S13. In contrast, if the number of UEs positioned in the boundary region of the predefined cell 10 is less than the threshold value (step S12; NO), the processing proceeds to step S14.

In step S13, if the spare cell C20 is not formed, the eNB forms the spare cell C20. When forming the spare cell C20, the eNB applies the radio frame configuration illustrated in FIG. 8 to the predefined cell C10 and the spare cell C20. Furthermore, the eNB transmits the broadcast information indicating the frame configuration of the first radio frame after change through the predefined cell C10, and transmits the broadcast information indicating the frame configuration of the second radio frame through the spare cell C20. As a result, the UE in which the reception level of the spare cell C20 is better than the reception level of the predefined cell C10 can perform a handover to the spare cell C20 on the basis of the broadcast information from the spare cell C20. Thus, the UE positioned in the boundary region of the predefined cell C10 can establish a connection with the spare cell C20. The UE that has established a connection with the spare cell C20 can perform normal communication with the eNB (the spare cell C20) without performing CoMP. In contrast, it is difficult for UE positioned in the boundary region of the predefined cell C10 of the eNB and the predefined cell of another eNB (see FIG. 4) to establish a connection with the spare cell C20, and therefore, the above Inter-Site CoMP is performed.

On the other hand, in step S14, if the spare cell C20 has been formed, the eNB ends the formation of the spare cell C20. When the formation of the spare cell C20 is ended, the eNB transmits the broadcast information indicating the frame configuration of the first radio frame after initialization through the predefined cell C10. Furthermore, the eNB instructs the UE connected to the spare cell C20 to perform a handover to the appropriate predefined cell C10. The above Inter-Site CoMP can be performed for UE positioned in the boundary region of the predefined cell C10 of eNB and the predefined cell of another eNB (see FIG. 4) even after the completion of formation of the spare cell C20.

(Conclusion)

As described above, the eNB has the predefined cells C10 that are mutually adjacent, and the spare cell C20 that covers the boundary region of the predefined cell C10. The predefined cell C10 uses a predetermined frequency band and a first radio frame. In order to share the predetermined frequency band with the predefined cells C10 through a time division, the spare cell C20 uses a second radio frame having a configuration different from the first radio frame. Thus, rather than performing Intra-Site CoMP with the predefined cells C10, the UE positioned in the boundary region of the predefined cells C10 can perform non-CoMP communication with one spare cell C20 that covers the boundary region. Therefore, the throughput in the cell boundary region can be improved without performing a complicated communication control.

In the present embodiment, when the UE is positioned in the boundary region of the predefined cells C10 and C11 belonging to different eNBs, the UE performs Inter-Site CoMP with the predefined cells C10 and C11. As a result, when communication cannot be performed through the spare cell C20, the Inter-Site CoMP can be applied to improve the throughput in the cell boundary region.

In the present embodiment, the eNB determines whether or not to form the spare cell C20 depending on the number of UEs positioned in the boundary region of the predefined cell C10. Therefore, the spare cell C20 can be formed when the throughput improvement effect by the spare cell C20 is expected to be high.

In the present embodiment, the first radio frame includes the first MBSFN subframes and the first non-MBSFN subframes. The second radio frame includes the second MBSFN subframes that overlap the first non-MBSFN subframes on the time axis, and the second non-MBSFN subframes that overlap the first MBSFN subframes on the time axis. Thus, by using the MBSFN subframes stipulated as a standard, time division multiplexing can be achieved without performing a complicated communication control.

(Other Embodiments)

Thus, the present invention has been described with the embodiment. However, it should not be understood that those descriptions and drawings constituting a part of the present disclosure limit the present invention. Further, various substitutions, examples, or operational techniques shall be apparent to a person skilled in the art on the basis of this disclosure.

In the above embodiment, JT and JR were described as an example of CoMP, however, another CoMP may also be applied. For example, DCS (Dynamic Cell Selection), a type of JP in the downlink, by which only the point having the best radio state performs transmission, and in the downlink, CS (Coordinated Scheduling), by which only one point possesses the data and scheduling resource assignment is performed among a plurality of points in cooperation with one another can be applied. Furthermore, in the downlink, CB (Coordinated Beamforming), by which only one point possesses the data and beamforming is performed among a plurality of points in cooperation with one another can be applied.

This application claims the benefit of priority from U.S. Provisional Application No. 61/604721 (filed on Feb. 29, 2012), the entire contents of which are incorporated herein by reference.

INDUSTRIAL APPLICABILITY

As described, the present invention is useful in mobile communication fields.

The invention claimed is:

1. A mobile communication system having a plurality of predefined cells that are mutually adjacent, comprising:
   a spare cell that covers a boundary region of the plurality of predefined cells, wherein
   the plurality of predefined cells use a predetermined frequency band and a first radio frame, wherein
   when the plurality of predefined cells belong to the same base station, the base station determines whether or not to form the spare cell depending on the number of user terminals positioned in the boundary region on the basis of a measurement result of the reception level of each user terminal to the base station, and
   the spare cell uses a second radio frame overlapping the first radio frame in frequency but shifted in time by more than at least one subframe and having a configuration different from the first radio frame so as to share the predetermined frequency band with the plurality of predefined cells through a time division.

2. The mobile communication system according to claim 1, wherein when a user terminal is positioned in the boundary region, if the plurality of predefined cells and the spare cell belong to the same base station, then the user terminal performs non-CoMP communication with the spare cell.

3. The mobile communication system according to claim 1, wherein when a user terminal is positioned in the boundary region, if the plurality of predefined cells belong to different base stations, then the user terminal performs CoMP communication with the plurality of predefined cells.

4. The mobile communication system according to claim 1, wherein
   the first radio frame includes a first MBSFN subframe and a first non-MBSFN subframe, and
   the second radio frame includes a second MBSFN subframe that overlaps the first non-MBSFN subframe on a time axis, and a second non-MBSFN subframe that overlaps the first MBSFN subframe on a time axis.

5. A base station having a plurality of predefined cells that are mutually adjacent, comprising:
   a spare cell that covers a boundary region of the plurality of predefined cells, wherein
   the plurality of predefined cells use a predetermined frequency band and a first radio frame, wherein
   when the plurality of predefined cells belong to the same base station, the base station determines whether or not to form the spare cell depending on the number of user terminals positioned in the boundary region on the basis of a measurement result of the reception level of each user terminal to the base station, and
   the spare cell uses a second radio frame overlapping the first radio frame in frequency but shifted in time by more than at least one subframe and having a configuration different from the first radio frame so as to share the predetermined frequency band with the plurality of predefined cells through a time division.

6. A user terminal in a mobile communication system having a plurality of predefined cells that are mutually adjacent, comprising:
   a control unit that controls to perform non-CoMP communication with a spare cell when the plurality of predefined cells and the spare cell that covers the boundary region belong to the same base station if the user terminal is positioned in the boundary region of the plurality of predefined cells, wherein
   the plurality of predefined cells use a predetermined frequency band and a first radio frame, wherein
   when the plurality of predefined cells belong to the same base station, the base station determines whether or not to form the spare cell depending on the number of user terminals positioned in the boundary region on the basis of a measurement result of the reception level of each user terminal to the base station, and
   the spare cell uses a second radio frame overlapping the first radio frame in frequency but shifted in time by more than at least one subframe and having a configuration different from the first radio frame so as to share the predetermined frequency band with the plurality of predefined cells through a time division.

* * * * *